(12) United States Patent
Yoon et al.

(10) Patent No.: US 11,658,507 B2
(45) Date of Patent: May 23, 2023

(54) BATTERY CHARGING METHOD AND ELECTRONIC DEVICE

(71) Applicant: Samsung Electronics Co., Ltd., Suwon-si (KR)

(72) Inventors: Sung-Geun Yoon, Hwaseong-si (KR); Kang-Jun Ko, Seoul (KR); Chul-Woo Park, Hwaseong-si (KR); Ku-Chul Jung, Suwon-si (KR); Seung-Chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 16/339,132

(22) PCT Filed: Sep. 27, 2017

(86) PCT No.: PCT/KR2017/010736
§ 371 (c)(1),
(2) Date: Apr. 3, 2019

(87) PCT Pub. No.: WO2018/066881
PCT Pub. Date: Apr. 12, 2018

(65) Prior Publication Data
US 2020/0044458 A1   Feb. 6, 2020

(30) Foreign Application Priority Data
Oct. 7, 2016   (KR) .................. 10-2016-0130014

(51) Int. Cl.
*H02J 7/34* (2006.01)
*H02J 7/00* (2006.01)
(52) U.S. Cl.
CPC ............ *H02J 7/34* (2013.01); *H02J 7/00036* (2020.01); *H02J 7/00047* (2020.01);
(Continued)

(58) Field of Classification Search
CPC .................................................. H02J 2207/20
See application file for complete search history.

(56) References Cited

U.S. PATENT DOCUMENTS

| 2007/0194626 A1 | 8/2007 | Eager et al. |
| 2008/0309294 A1* | 12/2008 | Inha .......................... H02J 7/00 320/164 |

(Continued)

FOREIGN PATENT DOCUMENTS

| CN | 201536143 U | 7/2010 |
| CN | 101820177 A | 9/2010 |

(Continued)

OTHER PUBLICATIONS

European Search Report dated Aug. 29, 2019, issued in European Patent Application No. 17858675.6.

(Continued)

*Primary Examiner* — Drew A Dunn
*Assistant Examiner* — Tynese V McDaniel
(74) *Attorney, Agent, or Firm* — Jefferson IP Law, LLP

(57) ABSTRACT

A battery charging method and an electronic device are disclosed. The electronic device can comprise: a connection unit comprising a first terminal to which a voltage is applied by an external device, and a second terminal for transmitting/receiving data; a first charging unit for charging a battery connected to the electronic device by using the voltage applied to the first terminal; and a second charging unit for charging the battery by dropping the voltage applied to the first terminal according to a preset voltage drop rate. The first charging unit can comprise: a first switch connected to the first terminal; a communication unit for transmitting information through the second terminal; and a first control unit for acquiring first information on the battery voltage, controlling the communication unit such that the first information is transmitted to a charger connected to the connec- (Continued)

tion unit, and controlling the first switch such that the voltage adjusted on the basis of the first information by the charger is supplied to the second charging unit through the first terminal.

12 Claims, 12 Drawing Sheets

(52) U.S. Cl.
CPC .. *H02J 7/007182* (2020.01); *H02J 7/007194* (2020.01); *H02J 7/00304* (2020.01); *H02J 7/00308* (2020.01); *H02J 7/00309* (2020.01); *H02J 7/00714* (2020.01); *H02J 2207/20* (2020.01)

(56) References Cited

U.S. PATENT DOCUMENTS

| | | | |
|---|---|---|---|
| 2009/0033293 A1* | 2/2009 | Xing | H02M 3/1588 320/164 |
| 2009/0079385 A1 | 3/2009 | Xiao et al. | |
| 2009/0295344 A1 | 12/2009 | Qu | |
| 2010/0164440 A1 | 7/2010 | Ikeda | |
| 2012/0249084 A1 | 10/2012 | Vilhauer et al. | |
| 2013/0207594 A1 | 8/2013 | Hung et al. | |
| 2013/0334883 A1* | 12/2013 | Kim | G06F 1/266 307/29 |
| 2014/0306673 A1* | 10/2014 | Le | H02M 3/07 323/266 |
| 2015/0091499 A1 | 4/2015 | Sun et al. | |
| 2015/0097538 A1* | 4/2015 | Le | H02M 3/07 323/271 |
| 2015/0295441 A1* | 10/2015 | Winger | G06F 1/266 320/107 |
| 2016/0056651 A1* | 2/2016 | Von Novak, III | H02J 7/0044 320/114 |
| 2016/0064979 A1* | 3/2016 | Huang | H02J 7/0029 320/114 |
| 2016/0164324 A1* | 6/2016 | Hsu | H02J 7/04 320/114 |
| 2017/0040822 A1* | 2/2017 | Li | H02J 7/00047 |
| 2017/0054328 A1* | 2/2017 | Jung | H02J 50/10 |
| 2017/0085098 A1* | 3/2017 | Sporck | H02J 7/02 |
| 2017/0294793 A1* | 10/2017 | Yoon | H02J 7/045 |
| 2017/0344508 A1* | 11/2017 | Setiawan | G06F 13/4282 |
| 2018/0041060 A1* | 2/2018 | Walley | H02J 7/00045 |
| 2018/0097372 A1* | 4/2018 | Li | H02J 7/0016 |

FOREIGN PATENT DOCUMENTS

| | | |
|---|---|---|
| CN | 103259300 A | 8/2013 |
| CN | 103502828 A | 1/2014 |
| JP | 2007-159279 A | 6/2007 |
| JP | 20100154692 A | 7/2010 |
| JP | 2011-114911 A | 6/2011 |
| KR | 10-2013-0140855 A | 12/2013 |
| KR | 10-2015-0048086 A | 5/2015 |

OTHER PUBLICATIONS

Chinese Office Action dated Dec. 29, 2021, issued in Chinese Application No. 201780061806.3.
Korean Office Action dated Mar. 20, 2023, issued in Korean Application No. 10-2016-0130014.

* cited by examiner

BATTERY CHARGING METHOD AND ELECTRONIC DEVICE

CROSS-REFERENCE TO RELATED APPLICATION(S)

This application is a U.S. National Stage application under 35 U.S.C. § 371 of an International application number PCT/KR2017/010736, filed on Sep. 27, 2017, which is based on and claimed priority of a Korean patent application number 10-2016-0130014, filed on Oct. 7, 2016, in the Korean Intellectual Property Office, the disclosure of which is incorporated by reference herein in its entirety.

BACKGROUND

1. Field

The present disclosure relates to an electronic device and a method for charging a battery connected to the electronic device. More specifically, the present disclosure relates to an electronic device and a method for charging a battery of the electronic device based on information associated with the battery.

2. Description of the Related Art

Recently, the use of electronic devices that are easy to carry, such as smartphones, tablet personal computers (PCs), wearable devices, etc., has proliferated, and the electronic devices are configured to perform various functions. For example, a variety of functions such as voice communication, Internet search, still and video photography, music playback, video watching, etc., may be performed in the electronic devices. In such portable devices, power is supplied through internal batteries. Naturally, power consumption of the batteries increases as the number of functions being performed rises.

To lengthen the use time of the electronic devices along with the increasing power consumption, the capacities of the batteries connected to the electronic devices have recently increased, and to charge the batteries of the electronic devices, chargers such as travel adaptors (TAs) which charge the batteries through a universal serial bus (USB) cable have been used.

SUMMARY

As stated above, due to the increasing capacity of the battery, a time required for charging the battery is also increasing. To shorten the charging time of the battery, the battery may be charged with high power by raising a voltage of the charger. However, in the case that high power is supplied to charge the battery, heat emission may occur in a charging unit for charging the battery in the electronic device, increasing a power loss and thus lowering charging efficiency.

Various embodiments of the present disclosure are made to solve the foregoing or other problems, and provide a method for charging a battery of an electronic device based on information associated with the battery and the electronic device.

According to various embodiments of the present disclosure, an electronic device includes a connector that includes a first terminal to which a voltage is applied by an external device and a second terminal for transmitting and receiving data, a first charging unit configured to charge a battery connected to the electronic device by using the voltage applied to the first terminal, and a second charging unit configured to charge the battery by dropping the voltage applied to the first terminal based on a preset voltage drop rate. The first charging unit may include a first switch connected with the first terminal, a communication unit configured to transmit information through the second terminal, and a first controller configured to obtain first information corresponding to a voltage of the battery, control the communication unit to transmit the first information to a charger connected with the connector, and control the first switch to supply a voltage adjusted based on the first information by the charger to the second charging unit through the first terminal.

According to various embodiments of the present disclosure, a method for charging a battery in an electronic device which includes a connector including a first terminal to which a voltage is applied by an external device and a second terminal for transmitting and receiving data, a first charging unit configured to charge the battery connected to the electronic device by using the voltage applied to the first terminal, and a second charging unit configured to charge the battery by dropping the voltage applied to the first terminal based on a preset voltage drop rate, includes obtaining first information corresponding to a voltage of the battery, transmitting the first information to a charger connected with the connector, from a communication unit of the first charging unit through the second terminal, controlling a first switch of the first charging unit connected with the first terminal to supply a voltage adjusted by the charger based on the first information to the second charging unit through the first terminal, and charging the battery using the voltage dropped by the second charging unit.

According to various embodiments of the present disclosure, a battery charging method and an electronic device may be provided which shorten a charging time, minimize heat emission, and improve charging efficiency by using information related to the battery.

DETAILED DESCRIPTION

Figure 1:
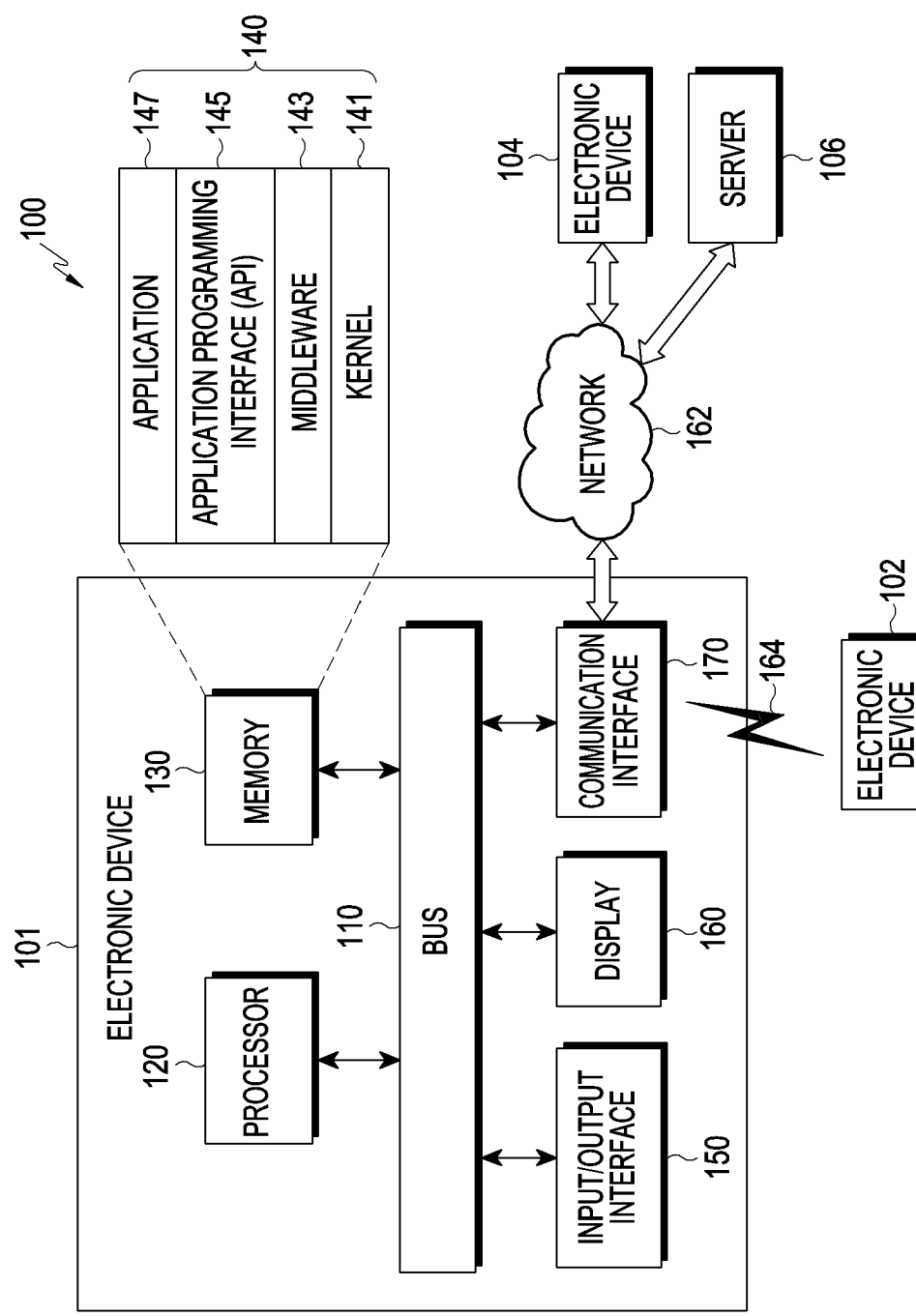
FIG. 1 illustrates a network environment including an electronic device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

Examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, a drone, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

Wireless communication may include a cellular communication protocol using at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and so forth. According to an embodiment, the wireless communication may include at least one of WiFi, Bluetooth, Bluetooth Low Energy (BLE), Zigbee, near field communication (NFC), magnetic secure transmission (MST), radio frequency (RF), or a body area network (BAN). According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS." The wired communication may include, for example, at least one of a universal serial bus (USB), a high definition multimedia interface (HDMI), a recommended standard (RS)-232, power line communication, a plain old telephone service (POTS), and so forth. The network 162 may include a telecommunications network, for example, at least one of a computer network (e.g., a local area network (LAN) or a wide area network (WAN)), Internet, or a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The other electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
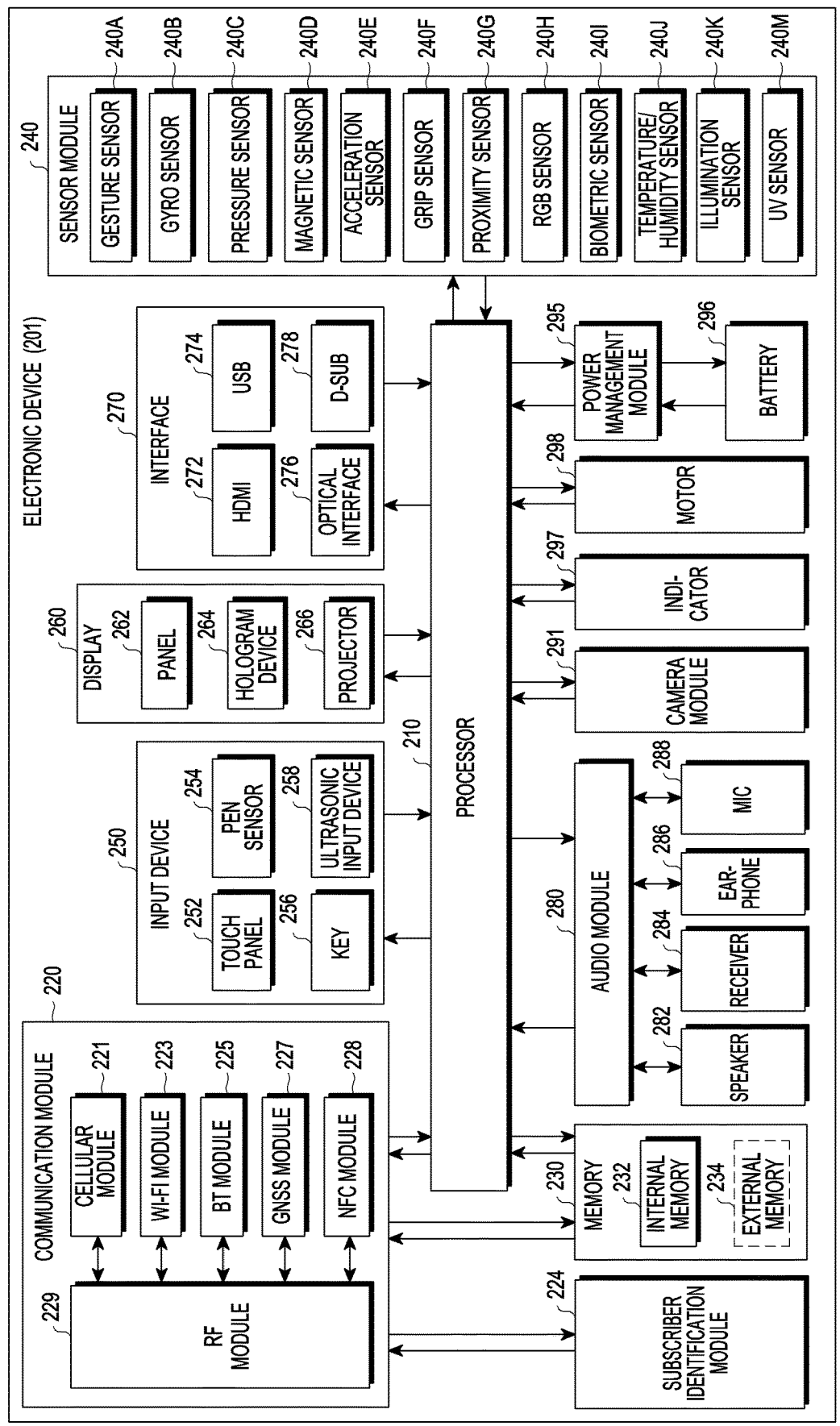
FIG. 2 is a block diagram of an electronic device according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, a near field communication (NFC) module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 may perform at least one of functions that may be provided by the processor 210. According to an embodiment, the cellular module 221 may include a communication processor (CP). According to some embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random-access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, or a solid-state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., red/green/blue (RGB) sensor), a biometric sensor 240I, a temperature/humidity sensor 240J, an illumination sensor 240K, or a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor," interchangeably used hereinafter) capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. The interface 270 may include an HDMI 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, an SD/multi-media card (MMC) interface, or an Infrared Data Association (IrDA) interface.

The audio module 280 may bi-directionally convert sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
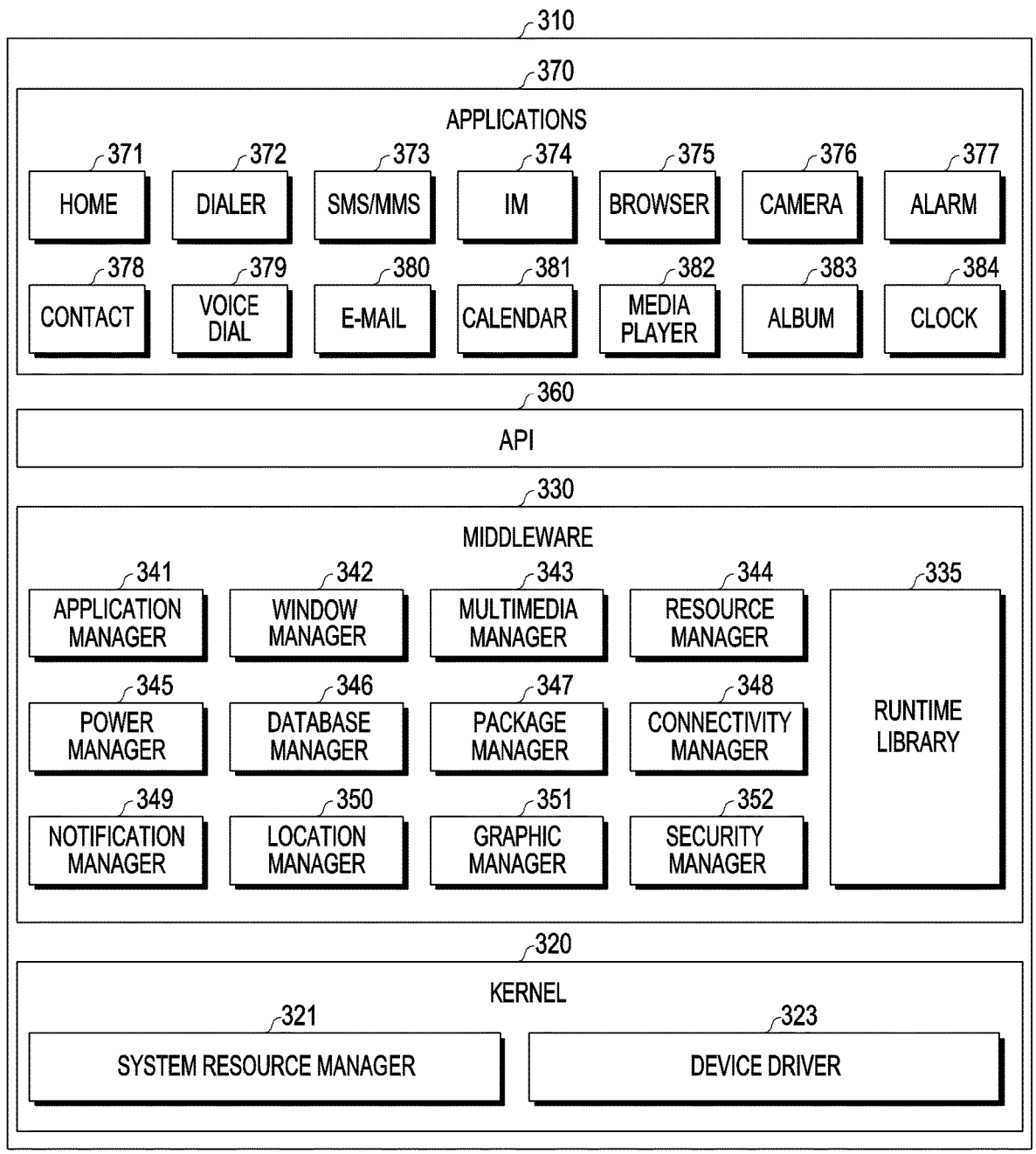
FIG. 3 is a block diagram of a programming module according to various embodiments of the present disclosure.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the electronic device 102, the electronic device 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a graphic user interface (GUI) resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format. The connectivity manager 348 manages a wireless connection. The notification manager 349 provides an event, e.g., an arriving message, an appointment, proximity notification, etc. The location manager 350 manages location information of an electronic device. The graphic manager 351 manages, for example, a graphic effect to be provided to a user or a user interface relating thereto. The security manager 352 provides, for example, system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IN/I) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4:
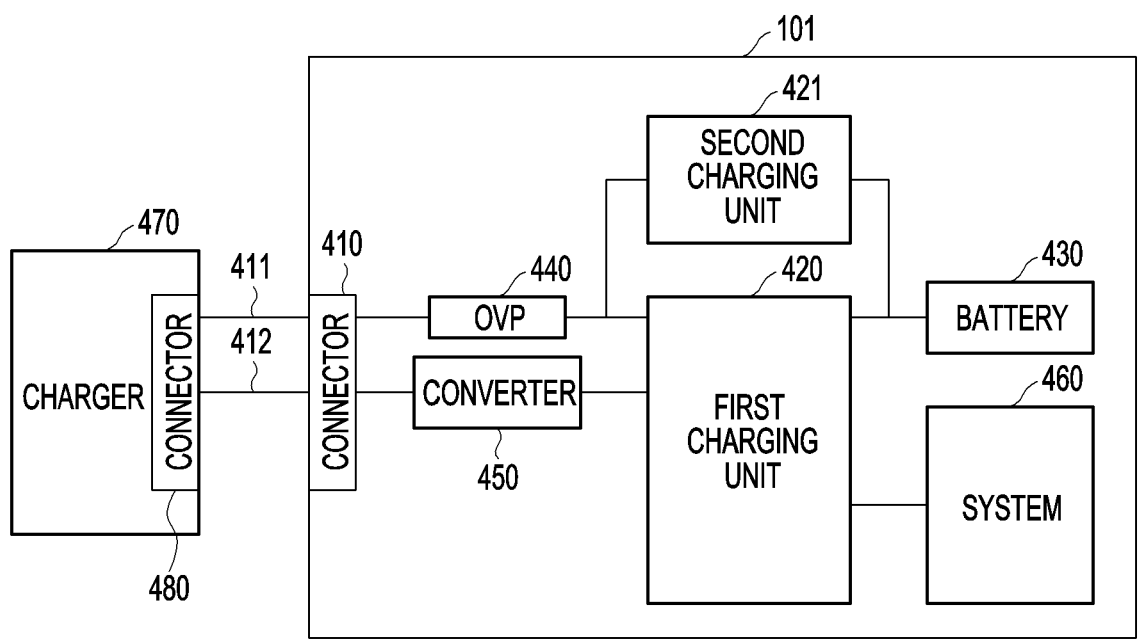
FIG. 4 is a block diagram of an electronic device and a charger according to various embodiments of the present disclosure.

FIG. 4 is a block diagram of an electronic device and a charger according to various embodiments of the present disclosure.

According to various embodiments of the present disclosure, the electronic device 101 may include a connector 410 and a first charging unit 420. The electronic device 101 may be connected with a charger 470 through the connector 410 and be supplied with power from the charger 470. The connector 410 may include a first terminal to which a voltage is applied from an external device and a second terminal for transmitting and receiving data to and from the external device. The connector 410 may further include another terminal(s) based on a preset criterion associated with the connector 410, e.g., a criterion described in related standards, in addition to the first and second terminals.

For example, the connector 410 may be configured to be connected with a USB connector that supports a USB type C, and thus, the connector 410 may further include terminals based on a criterion described in standards related to the USB type C. The first terminal may be connected with a voltage line 411 of the USB connector, and a voltage may be applied to the first terminal by an external electronic device. The second terminal may be connected to a data line 412 of the USB connector for data transmission and reception, and transmit and receive data to and from an external electronic device through the data line 412. For example, the data line 412 may include a D+/D– line or a configuration channel (CC) line of the USB connector that supports the USB type C.

The electronic device 101 may further include a converter 450 that converts data into a data format that may be transmitted through the data line 412 of the USB connector to transmit the data to an external device through the data line 412. For example, when the data line 412 includes the CC line, the converter 450 may convert data into a data format that may be transmitted through the CC line to transmit the data to the external device through the CC line. Thus, the electronic device 101 may convert data for transmission to the external device into a data format that may be transmitted through the CC line, and transmit the data, the format of which is converted, to the external device through the CC line. The data converter 450 may be an element that is separate from the first charging unit 420 or may be included in the first charging unit 420.

The electronic device 101 may further include a protection device such as an over voltage protector (OVP) 440, an over current protector (OCP), an over temperature protector (OTP), a under voltage lock out (UVLO), or the like. For example, as shown in FIG. 4, the OVP 440 may be arranged between the first terminal and the first charging unit 420, and when the voltage to be applied to the first terminal is greater than or equal to a predefined threshold voltage, the voltage may be blocked to protect elements of the electronic device 101. Other protection devices (e.g., OTP, UVLO, OCP, etc.) may also be used to protect the elements of the electronic device 101.

According to various embodiments of the present disclosure, the first charging unit 420 may charge a battery 430 connected to the electronic device 101 with the power applied to the first terminal from the charger 470. At least one of the power of the battery 430 or the power supplied from the charger 470 may be supplied to a system 460 to drive the system 460. The system 460 may include all of the elements included in the electronic device 101 as well as the elements of the electronic device 101 illustrated in FIG. 4. For example, all the elements included in the electronic device 101 may be illustrated in FIG. 1 or FIG. 2.

According to various embodiments of the present disclosure, the first charging unit 420 may obtain information associated with the battery 430 that is to be charged. For example, the first charging unit 420 may obtain first information corresponding to the voltage of the battery 430 and use this first information to charge the battery 430. The first charging unit 420 may obtain information associated with the battery 430, which includes at least one of a charging current of the battery 430, a state of charge (SOC) of the battery 430, a surface temperature of the electronic device 101, a temperature of the battery 430, or consumed current of the battery 430, as well as the first information, and use the obtained information to charge the battery 430. Note that the information associated with the battery 430 is merely an example, and a variety of information associated with the battery 430, available for identifying the output voltage or output current of the charger 470, may be used.

According to various embodiments of the present disclosure, the first charging unit 420 may transmit the first information corresponding to the voltage of the battery 430 to the charger 470, and a voltage adjusted by the charger 470 based on the first information may be applied to the first terminal. The first charging unit 420 may transmit the first information to the charger 470 through the second terminal of the connector 410 by using a communication unit in the first charging unit 420. The first charging unit 420 may transmit the first information to the charger 470 by using an element of the electronic device 101 (e.g., the communication interface 170, the I/O interface 150, etc.).

The first charging unit 420 may transmit the information associated with the battery 430, which includes at least one of the charging current of the battery 430, the SOC of the battery 430, the surface temperature of the electronic device 101, the temperature of the battery 430, or the consumed current of the battery 430, to the charger 470, and receive a voltage or a current adjusted based on the first information and the information associated with the battery 430.

According to various embodiments of the present disclosure, the first charging unit 420 may further transmit second information corresponding to a voltage drop rate that is set in the electronic device 101 to the charger 470. For example, the voltage drop rate may be identified using a value of a current required for charging the battery 430 and a maximum value of a current set for a first line connecting the first terminal with the second charging unit 421. For example, when a value of the current required for charging the battery 430 is 6A and a maximum value of the current set for the first line is 3A, a voltage drop rate may be identified as 1/2.

The maximum value of the current set for the first line is a feature associated with the first line and thus may be a fixed value. The value of the current required for charging the battery 430 may be fixed to a value set at the time of manufacturing of the electronic device 101, or may be changed by user's setting, etc. Thus, the voltage drop rate may also be fixed to a value set at the time of manufacturing of the electronic device 101, or may be changed by user's setting, etc.

When a current having a value exceeding the maximum value of the current set for the first line is applied through the first terminal, each element of the electronic device 101 may be damaged. To apply a current having a value less than or equal to the maximum value of the current set for the first line, the second information corresponding to the voltage drop rate may be transmitted to the charger 470. The second information may be transmitted each time when the electronic device 101 and the charger 470 are connected with each other. The second information may be transmitted in the initial connection between the electronic device 101 and the charger 470, and for subsequent connections, may be transmitted only when the voltage drop rate is changed.

The value of the current required for battery charging may be set less than or equal to a maximum value of a current set for a second line connecting the second charging unit 421 with the battery 430. When the value of the current required for battery charging is set to a value exceeding the maximum value of the current set for the second line, each element of the electronic device 101 may be damaged. Subsequently, the value of the current required for battery charging may be set to a value less than or equal to the maximum value of the current set for the second line.

According to various embodiments of the present disclosure, the first line may be configured to have a maximum value of a current less than the maximum value of the current set for the second line. As a value of a current used for charging the battery 430 increases, a time required for charging the battery 430 decreases. However, generally, as a maximum value of a current set for a line increases, a production cost may increase and the amount of lost power may increase. Thus, to reduce a production cost and produced heat while charging the battery 430 with a high value of a current for reducing the charging time of the battery 430, the second line that directly supplies power to the battery 430 may be configured to have a maximum value of a current greater than that of the first line.

According to various embodiments of the present disclosure, the charger 470 may receive the first information or the second information from the electronic device 101. The charger 470 may also receive the information associated with the battery 430 from the electronic device 101. For example, the charger 470 may receive the first information or the second information through a terminal for data transmission and reception, included in a connector 480 of the charger 470. The charger 470 may identify a voltage or a current to be supplied to the electronic device 101 based on the first information, and adjust an output voltage or current of the charger 470 to output the identified voltage or current. The charger 470 may identify at least one of a voltage or a current to be supplied to the electronic device 101, based on the first information and the second information, and adjust at least one of the output voltage or output current of the charger 470 to output the identified voltage or current. Hereinbelow, for convenience of a description, the description will be made focusing on adjustment of the output voltage by the charger 470, but the charger 470 may adjust at least one of the output voltage or the output current.

According to various embodiments of the present disclosure, the first charging unit 420 may control a switch included in the first charging unit 420 to supply the voltage adjusted based on the first information to the second charging unit 421 through the first terminal. The switch is a switch connected with the first terminal, in which the voltage applied to the first terminal may be supplied to the first charging unit 420 when the switch is turned on, and the voltage applied to the first terminal may be supplied to the second charging unit 421 without being supplied to the first charging unit 420 when the switch is turned off.

When the voltage adjusted based on the first information is applied, the first charging unit 420 may control the switch included therein to supply the adjusted voltage applied to the first terminal to the second charging unit 421 such that the battery 430 may be charged through the second charging unit 421. The first charging unit 420 may detect an acknowledgement signal received in response to a voltage adjust request sent to the charger 470 or detect a magnitude of voltage to be applied to the first terminal to identify whether the adjusted voltage is applied to the first terminal.

According to various embodiments of the present disclosure, the second charging unit 421 may drop voltage to be applied to the first terminal based on a voltage drop rate set in the electronic device 101 and supply the dropped voltage to the battery 430 which may then be charged with the dropped voltage. For example, the second charging unit 421 may drop the adjusted voltage to be applied to the first terminal based on a voltage drop rate through at least one voltage converter of the second charging unit 421. The second charging unit 421 may supply the voltage dropped through the at least one voltage converter to the battery 430 which may then be charged with the dropped voltage. A detailed method for charging the battery 430 through the second charging unit 421 will be described later.

Figure 5:
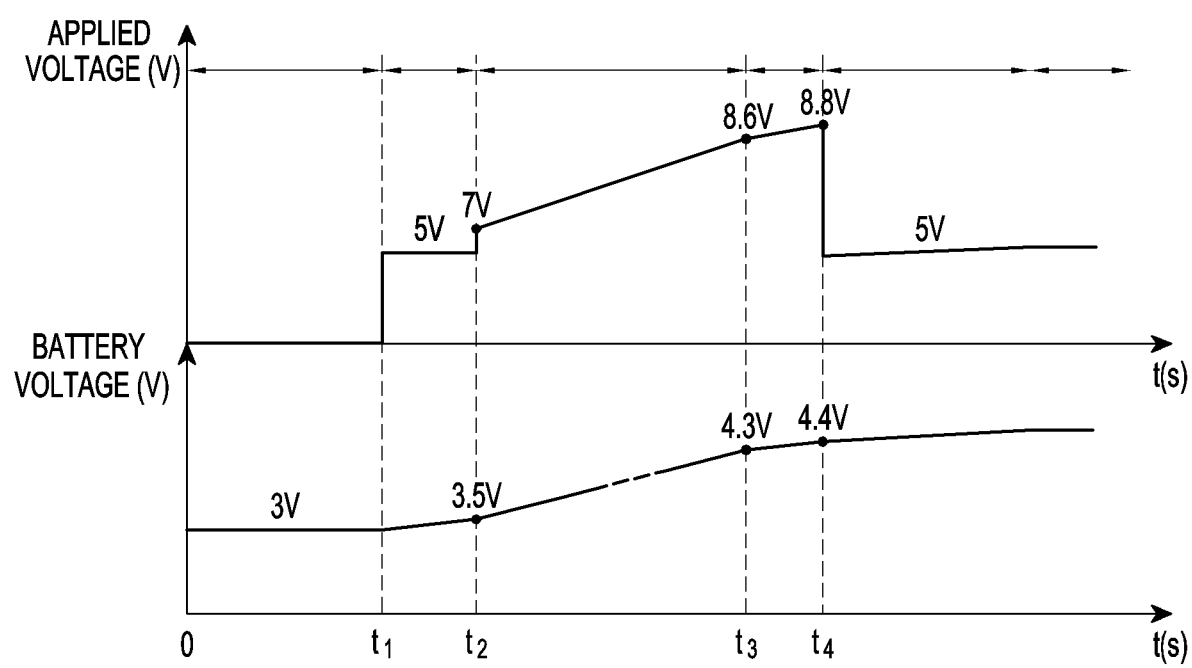
FIG. 5 shows graphs of changes in an applied voltage and a battery voltage according to various embodiments of the present disclosure.

FIG. 5 shows graphs of changes in an applied voltage and a battery voltage according to various embodiments of the present disclosure.

The graphs illustrated in FIG. 5 show a change in an applied voltage, a battery voltage, and a charging current of a charger during charging of a battery when the charger is connected to the electronic device 101 at a point in time $t_1$.

According to various embodiments of the present disclosure, the electronic device 101 may perform battery charging by switching between a conventional battery charging scheme in which a fixed voltage is supplied from the charger to charge the battery, and a battery charging scheme in which the voltage adjusted based on the first information is supplied from the charger to charge the battery. The electronic device 101 may use the conventional battery charging scheme in a period where battery charging with the fixed voltage is needed.

Hereinbelow, for convenience, it is assumed that battery charging starts from the point in time $t_1$ and a magnitude of voltage before start of charging is 3V. It is also assumed that a battery voltage less than 3.5V from the point in time $t_1$ to a point in time $t_2$ is less than a first threshold value and a battery voltage greater than or equal to 4.4V after a point in time $t_4$ is greater than or equal to a second threshold value. Herein, the first threshold value may be set higher than a final discharge voltage of the battery by a specific amount according to characteristics of the battery, the electronic device 101, or the charger. The second threshold value may be set lower than a fully-charged voltage of the battery by a particular amount according to the characteristics of the battery, the electronic device 101, or the charger.

When the battery needs to be or should be charged with low current, the electronic device 101 may charge the battery using the conventional battery charging scheme in which a fixed voltage (e.g., of 5V) is supplied to charge the battery. For example, when the battery voltage is lowered close to the final discharge voltage as shown from $t_1$ to $t_2$, and when the charger resumes charging after being connected to the electronic device 101, or when the electronic device 101 reduces the charging current of the battery in a high-temperature or low-temperature environment, then the battery may be charged using the conventional battery charging scheme.

To precisely control voltage and charging current of the battery, the electronic device 101 may use the conventional battery charging scheme in which the fixed voltage (e.g., of 5V) is supplied to charge the battery. In this way, the electronic device 101 may control battery charging more precisely.

The electronic device 101 may need to control the voltage and charging current of the battery more precisely at a charging termination point in time of the battery when the voltage of the battery increases close to the fully-charged voltage of the battery, for example, as in a period after $t_4$. Thus, the electronic device 101 may use the conventional battery charging scheme in a period after $t_4$.

In a period where high-speed charging of the battery is desired or needed, the electronic device 101 may perform battery charging in by using a battery charging scheme in which the voltage adjusted based on the first information corresponding to the voltage of the battery is supplied from the charger 470 to charge the battery. For example, to minimize heat produced during high-speed charging of the battery and increase the efficiency of the charging, in the periods from $t_2$ to $t_4$ where the battery voltage is greater than or equal to the first threshold value and is less than the second threshold value, the electronic device 101 may use the battery charging scheme in which the voltage adjusted based on the first information corresponding to the voltage of the battery is supplied from the charger 470 to charge the battery.

The electronic device 101 may send a request to the charger 470 for adjustment of the applied voltage to change the battery charging scheme in a period needing the high-speed charging. For example, when identifying that the battery voltage is greater than or equal to the first threshold value and is less than the second threshold voltage, the electronic device 101 may send a request to the charger for adjustment of the voltage to be applied to the first terminal. The charger 470 may adjust the voltage to be applied to the electronic device 101 in response to the request received from the electronic device 101.

For example, the charger may adjust the voltage to be applied to the electronic device 101 based on the first information received from the electronic device 101. For example, the charger may identify current voltage of the battery based on the first information. The charger may adjust the voltage to be applied to the electronic device 101 to a voltage raised from the current voltage of the battery based on the voltage drop rate set in the electronic device 101. The charger may identify the voltage drop rate set in the electronic device 101 based on the second information corresponding to the voltage drop rate received from the electronic device 101. The charger may also identify the voltage drop rate set in the electronic device 101 from previously stored information.

For example, the charger may adjust the voltage to be applied to the electronic device 101 to a voltage raised as two times large as the identified voltage of the battery when the voltage drop rate set in the electronic device 101 is 1/2. As illustrated in FIG. 5, the charger may adjust the voltage to be applied to the electronic device 101 to a voltage of 7 V into which a battery voltage of 3.5 V identified at $t_2$ is doubled.

As the voltage of the battery increases due to charging of the battery, the charger may raise the voltage to be applied to the electronic device 101. For example, as illustrated in FIG. 5, the charger may adjust the voltage to be applied to the electronic device 101 to a voltage of 8.6 V into which a battery voltage of 4.3 V identified at $t_3$ is doubled. Likewise, the charger may adjust the voltage to be applied to the electronic device 101 to a voltage of 8.8 V into which a battery voltage of 4.4 V identified at $t_4$ is doubled.

The charger may identify a voltage to be lost during the supply of the applied voltage to the battery. Thus, the charger may adjust the voltage to be applied to the electronic device 101 to a voltage resulting from adding the lost voltage to the voltage raised based on the voltage drop rate. For example, although not shown in FIG. 5, the charger may adjust the voltage to be applied to the electronic device 101 to a voltage resulting from adding the identified lost voltage to a voltage of 7V into which a battery voltage of 3.5V identified at $t_2$ is doubled. Similarly, the charger may adjust the voltage to be applied to the electronic device 101 to a voltage resulting from adding the identified lost voltage to a voltage into which battery voltage identified from $t_2$ to $t_4$ is doubled.

The electronic device 101 may charge the battery by fixedly supplying current identified based on capacity of the battery to the battery or may change a charging current based on the voltage of the battery changing with charging of the battery. For example, the electronic device 101 may change the charging current based on profile information indicating a relationship between preset voltage and current used for charging.

For example, even when a voltage of the battery is greater than or equal to the first threshold value and is less than the second threshold value, a value of a current to be supplied to the battery may be reduced to precisely control a voltage and a current of the battery. For example, as in a period from $t_3$ to $t_4$ in FIG. 5, when a voltage of the battery is close to a full-charged voltage of the battery, i.e., when the voltage of the battery is greater than or equal to a preset particular voltage, a value of the current to be supplied to the battery may be reduced to precisely control the voltage and current of the battery. Accordingly, the voltage and current of the battery may be precisely controlled.

As described above, the electronic device 101 may efficiently perform battery charging by switching the above-described battery charging schemes. Herein below, a detailed description will be made of a battery charging scheme in which the electronic device 101 charges the battery with a voltage adjusted by the charger based on the first information.

Figure 6:
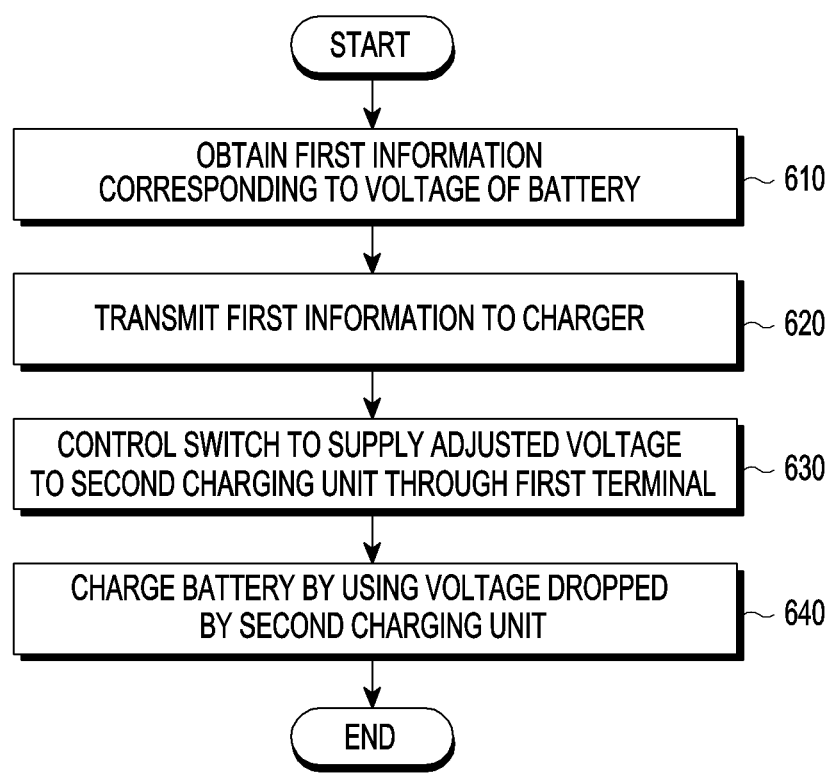
FIG. 6 is a flowchart of a method for charging a battery in an electronic device according to various embodiments of the present disclosure.

FIG. 6 is a flowchart of a method for charging a battery in an electronic device according to various embodiments of the present disclosure.

Figure 7:
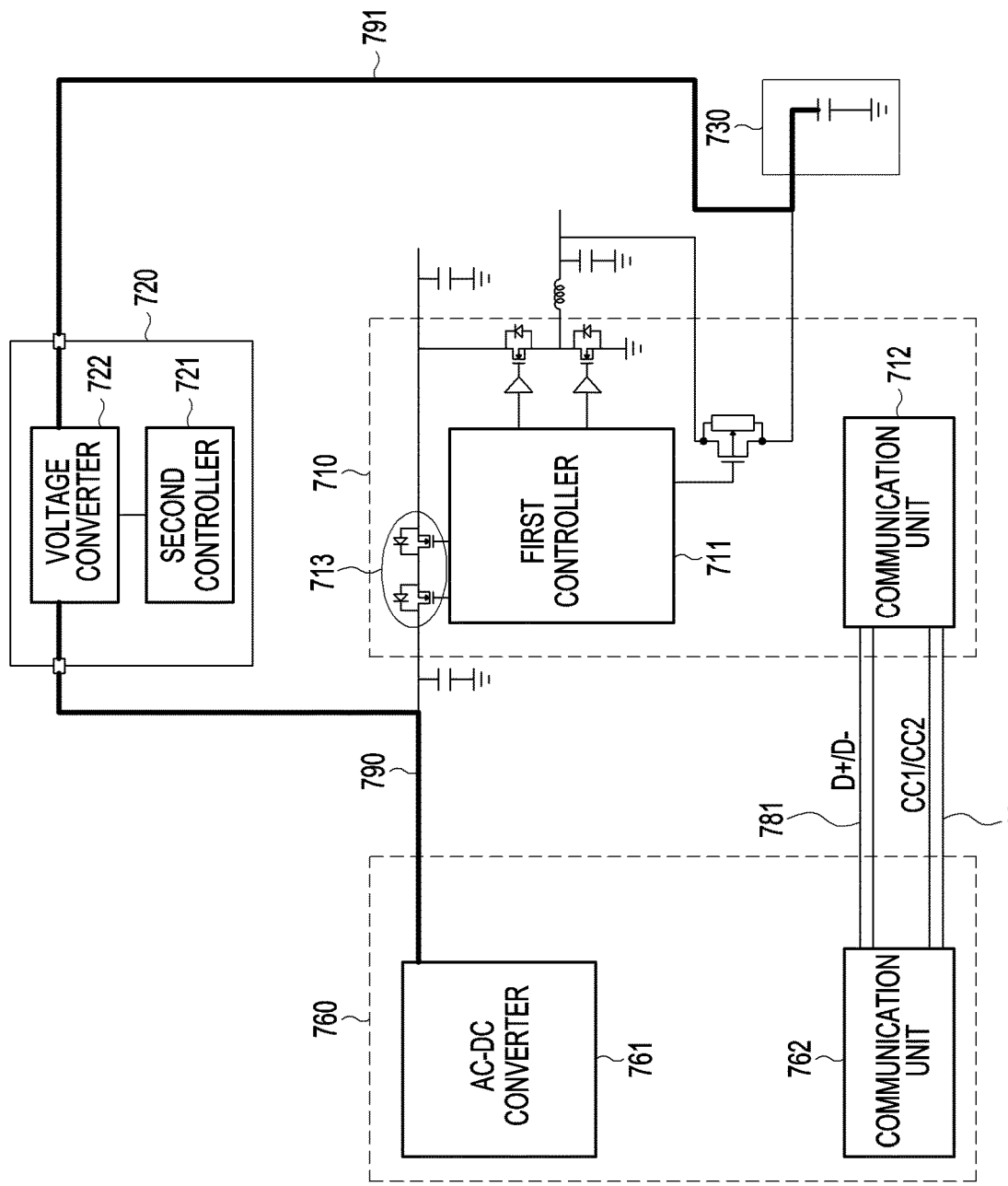
FIG. 7 is a circuit diagram of an electronic device according to various embodiments of the present disclosure.

In operation 610, a first controller 711 of a first charging unit 710 included in the electronic device 101 may obtain first information corresponding to a voltage of a battery 730 connected to the electronic device 101. Referring to FIG. 7, the battery 730 may be electrically connected with the first charging unit 710 and a second charging unit 720, or the first charging unit 710 may obtain the first information corresponding to the voltage of the battery 730. The second charging unit 720 may obtain the first information and deliver the obtained first information to the first charging unit 710. Moreover, the first charging unit 710 may further obtain the second information corresponding to a voltage drop rate that is set in the electronic device 101 or the information associated with the battery. The information associated with the battery may include at least one of the charging current of the battery, the SOC of the battery, the surface temperature of the electronic device 101, the temperature of the battery, or the consumption current of the battery.

In operation 620, the first controller 711 may transmit the first information to the charger 760 through the second terminal of the connector by using a communication unit 712 of the first charging unit 710. The first controller 711 may transmit the second information or the information associated with the battery to the charger 760 through the second terminal by using the communication unit 712. As shown in FIG. 7, the electronic device 101 may be connected with the charger 760 through the connector. The charger 760 may apply a voltage to the first terminal of the connector and transmit and receive data to and from the electronic device 101 through the second terminal of the connector.

In FIG. 7, it is assumed that the connector is connected to a USB connector of the charger 760 that supports a USB type C. In this case, the second terminal may be connected to a D+/D− line 781 or CC lines CC1 and CC2 782 of the USB connector. Thus, the communication unit 712 of the first charging unit 710 may transmit the first information or the second information related to the battery to a communication unit 762 of the charger 760 through the D+/D− line 781 or the CC lines CC1 and CC2 782.

Moreover, when the first controller 711 transmits the first information or the second information through the CC line, the first controller 711 may convert a data format of the first information or the second information into a data format that is transmittable through the CC line through a converter (not shown), and then transmit the data-format-converted first information or second information to the charger 760.

While the first information, the second information, or the information associated with the battery is illustrated as being transmitted through the communication unit 720 included in the first charging unit 710, it may be transmitted to the charger 760 through an element of the electronic device 101 (e.g., the communication interface 170, the I/O interface 150, etc.).

The first controller 711 may send a request for adjustment of the voltage to be applied to the first terminal to the charger 760 based on at least one of the obtained first information or information associated with the battery. The first controller 711 may identify whether to switch the battery charging scheme based on the obtained first information or information associated with the battery, as described with reference to FIG. 5. For example, the first controller 711 may identify based on at least one of the first information or the information associated with the battery whether to charge the battery with a low current by using the conventional battery charging scheme or to charge the battery at a high speed without having to control the voltage and the current of the battery more precisely. When identifying that the voltage of the battery 730 is greater than or equal to a preset first threshold value and is less than a second threshold value based on the first information, the first controller 711 may control the communication unit 712 to send a request for adjustment of the voltage to be applied to the first terminal to the charger 760.

In operation 630, the first controller 711 may control a switch 713 to supply the adjusted voltage applied to the first terminal to the second charging unit 720 through the first terminal. For example, the switch 713 of the first charging unit 710 may be connected with the first terminal, in which the voltage applied to the first terminal may be supplied to the first charging unit 710 when the switch 713 is turned on, and the voltage applied to the first terminal may be supplied to the second charging unit 720 when the switch 713 is turned off.

The charger 760 may include an analog current (AC)-digital current (DC) converter 761 for converting an AC voltage supplied from a power source to a DC voltage and a communication unit 762 for transmitting and receiving data to and from an external device. The charger 760 may receive the first information received through the communication unit 762. The charger 760 may identify a voltage or current to be supplied to the electronic device 101 based on the first information, and adjust the voltage or current supplied to the electronic device 101 to the identified voltage or current through the AC-DC converter 761. The charger 760 may apply the adjusted voltage or current to the first terminal of the electronic device 101. The charger 760 may further receive the second information corresponding to the voltage drop rate or the information associated with the battery from the electronic device 101 to adjust a voltage or a current, and adjust the voltage by further using the second information or the information associated with the battery as well as the first information.

More specifically, the charger 760 may identify a current voltage of the battery 730 from the first information. The charger 760 may raise the identified current voltage of the battery 730 based on the voltage drop rate identified from the second information. For example, the charger 760 may raise the current voltage of the battery 730 to n*V1 when the current voltage of the battery 730 is V1 and the voltage drop rate is 1/n.

In operation 640, a second controller 721 of the second charging unit 720 may charge the battery by using a voltage dropped based on the voltage drop rate through a voltage converter 722 of the second charging unit 720. The second controller 721 may control an operation of the voltage converter 722, and the voltage converter 722 may drop the adjusted voltage based on the voltage drop rate.

For example, the second controller 721 may drop the voltage of n*V1 applied to the first terminal by the charger 760 to V1 based on the voltage drop rate of 1/n. A detailed method for controlling the voltage converter 722 to drop the adjusted voltage by the second controller 721 will be described later.

The second controller 721 may supply the voltage dropped by the voltage converter 722 to the battery 730 which may then be charged with the dropped voltage.

A first line 790 connecting the first terminal with the second charging unit 720 may be configured to have a maximum value of a current, which is less than that of a current, set for a second line 791 connecting the second charging unit 720 with the battery 730. As a value of a current used for charging the battery 730 increases, a time required for charging the battery 730 decreases. However, generally, as a maximum value of a current set for a line increases, a production cost may increase and the amount of lost power may increase. Thus, to reduce a cost and produced heat while charging the battery 730 with a high value of a current for reducing the charging time of the battery 730, the second line 791 that directly supplies power to the battery 730 may be configured to have a maximum value of a current greater than that of the first line 790.

Figure 8:
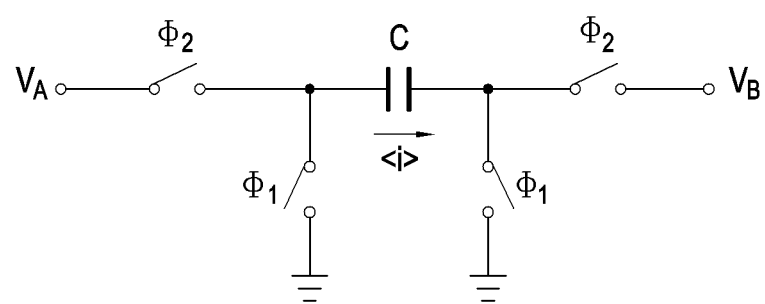
FIG. 8 is a circuit diagram of a voltage converter according to various embodiments of the present disclosure.

FIG. 8 is a circuit diagram of a voltage converter according to various embodiments of the present disclosure.

Referring to FIG. 8, the voltage converter included in the second charging unit 421 may include a switched capacitor circuit including a plurality of switches $\Phi_1$ and $\Phi_2$ that are opened or short-circuited based on a duty cycle corresponding to a voltage drop rate set in the electronic device 101 and a capacitor C.

The second controller included in the second charging unit may control an operation of the voltage converter by controlling at least one of the plurality of switches $\Phi_1$ and $\Phi_2$ of the voltage converter or the duty cycle.

For example, the second controller may control the plurality of switches $\Phi_1$ and $\Phi_2$ to operate the voltage converter once the voltage adjusted by the charger is applied to the first terminal. The second controller may control the duty cycle to drop the voltage to be supplied to the voltage converter depending on the voltage drop rate. For example, when the voltage drop rate is 1/2, the second controller may control the duty cycle to remain at 0.5, and when the voltage drop rate is 1/4, the second controller may control the duty cycle to remain at 0.25. As such, by adjusting the duty cycle based on the voltage drop rate, the second controller may control the voltage converter to drop the voltage to be supplied based on the voltage drop rate.

The second charging unit 421 may include a plurality of voltage converters to drop the adjusted voltage to be applied to the first terminal and may control an operation of each of the plurality of voltage converters through the second controller. The second controller may control the operation of each of the plurality of voltage converters by controlling a plurality of switches or a duty cycle of each of the plurality of voltage converters.

For example, the second controller may drop the adjusted voltage based on the voltage drop rate by controlling the plurality of switches and the duty cycle of each of the plurality of voltage converters. The second controller may maintain the duty cycle of each of the plurality of voltage converters at a fixed value and select at least one voltage converter from among the plurality of voltage converters to drop the adjusted voltage. The second controller may control the selected at least one voltage converter to operate in a voltage drop mode for dropping an input voltage and the other converters to operate in a bypass mode for bypassing the input voltage, thereby dropping the adjusted voltage based on the voltage drop rate.

For example, when a duty cycle of each of the plurality of voltage converters is fixed to 0.5, a voltage supplied through one voltage converter may be dropped by 1/2 times thereof. In this case, when the voltage drop rate is 1/4, the second controller may select two voltage converters from among the plurality of voltage converters and control the two selected voltage converters to operate in the voltage drop mode and the other voltage converters to operate in the bypass mode. Thus, a voltage supplied to the second charging unit 421 may be dropped by 1/2 times thereof by each of the two selected voltage converters, such that the voltage may be dropped by a total of 1/4 times thereof.

Figure 9:
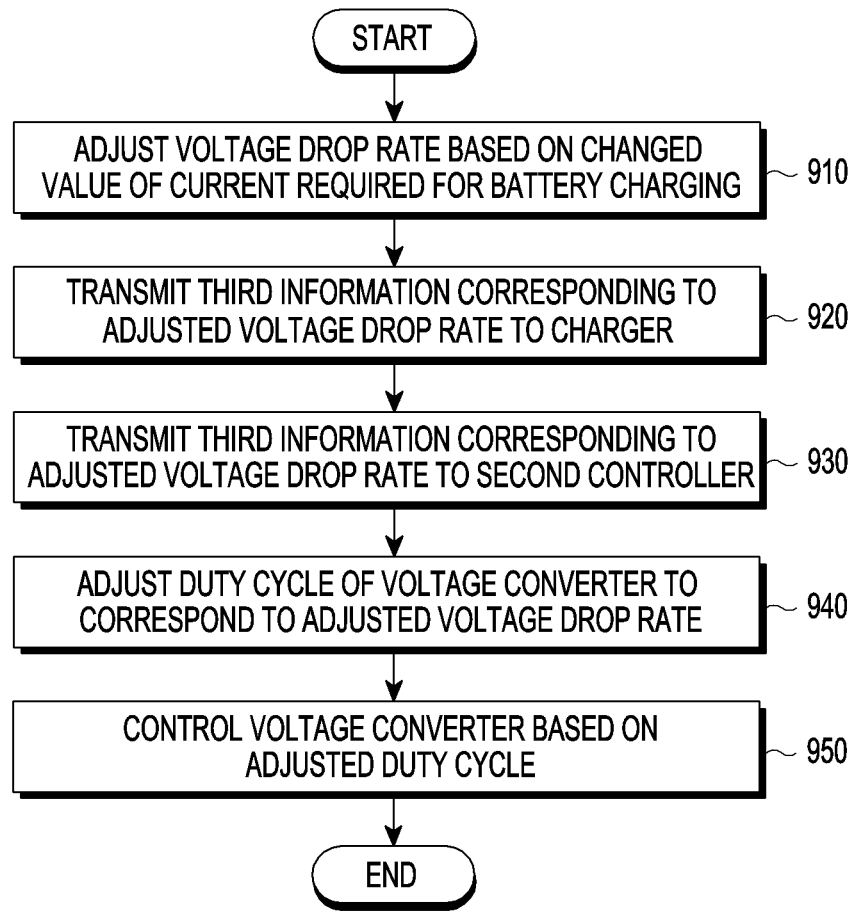
FIG. 9 is a flowchart of a method for adjusting a duty cycle of a voltage converter in an electronic device according to various embodiments of the present disclosure.

FIG. 9 is a flowchart of a method for adjusting a duty cycle of a voltage converter in an electronic device according to various embodiments of the present disclosure.

In FIG. 9, a description will be made of an operation of the electronic device 101 with respect to a change in a voltage drop rate when the second charging unit 421 includes one voltage converter 1020 and a second controller 1010 for controlling the voltage converter 1020 as in FIG. 10.

In operation 910, when a value of current required for battery charging is changed, the first controller of the first charging unit 420 may adjust the voltage drop rate set in the electronic device 101 based on the changed value of the current. The voltage drop rate set in the electronic device 101 may be identified using a value of current required for battery charging and a maximum value of current set for the first line connecting the first terminal of the connector with the second charging unit 421. Thus, when the value of the current required for battery charging is changed, the first controller may adjust the voltage drop rate set in the electronic device 101 based on the changed value of the current.

The first controller may obtain information corresponding to temperature of the electronic device 101, temperature of the battery, or temperature of the charger and adjust the voltage drop rate based on at least one of the obtained temperature of the electronic device 101, temperature of the battery, or temperature of the charger. For example, when at least one of the temperature of the electronic device 101, the temperature of the battery, or the temperature of the charger increases, the first controller may adjust the voltage drop rate to increase a magnitude of a voltage to be applied by the charger so as to reduce a magnitude of charging current of the battery. For example, when at least one of the temperature of the electronic device 101, the temperature of the battery, or the temperature of the charger increases, the first controller may adjust the voltage drop rate from 1/2 to 1/4 and transmit information corresponding to the adjusted voltage drop rate to the charger. Thus, the charger may adjust a voltage to be applied to the electronic device 101 based on information corresponding to the adjusted voltage drop rate, and apply the adjusted voltage to the electronic device 101.

The first controller may send a request for reduction of a magnitude of current to be applied to the charger when at least one of the temperature of the electronic device 101, the temperature of the battery, or the temperature of the charger increases. Upon receiving the request, the charger may adjust the current such that the magnitude of the current to be applied to the electronic device 101 is reduced, and apply the adjusted current to the electronic device 101.

In operation 920, the first controller may control the communication unit of the first charging unit 421 to transmit third information corresponding to the adjusted voltage drop rate to the charger. The charger may adjust the voltage to be applied to the electronic device 101 based on the voltage drop rate set in the electronic device 101 or the information associated with the battery as well as the voltage of the battery. Therefore, when the voltage drop rate is adjusted, the first controller may transmit the third information corresponding to the adjusted voltage drop rate to the charger. The charger may adjust the voltage to be applied to the electronic device 101 based on the received third information.

In operation 930, the first controller may transmit the third information corresponding to the adjusted voltage drop rate to the second controller 1010. Since the second controller 1010 drops the voltage to be applied, based on the voltage drop rate, the first controller may transmit the third information corresponding to the adjusted voltage drop rate to the second controller 1010 when the voltage drop rate is adjusted.

When a value of current required for battery charging is changed, the first controller may transmit information corresponding to the changed value of the current to the second controller 1010. In this case, the second controller 1010 may adjust the voltage drop rate based on the information corresponding to the changed value of the current received from the first controller.

In operation 940, the second controller 1010 may adjust a duty cycle of the voltage converter 1020 to correspond to the adjusted voltage drop rate identified from the third information received from the first controller.

In operation 950, the second controller 1010 may control the voltage converter 1020 to drop the adjusted voltage by using the third information with the charger based on the adjusted duty cycle.

Figure 10:
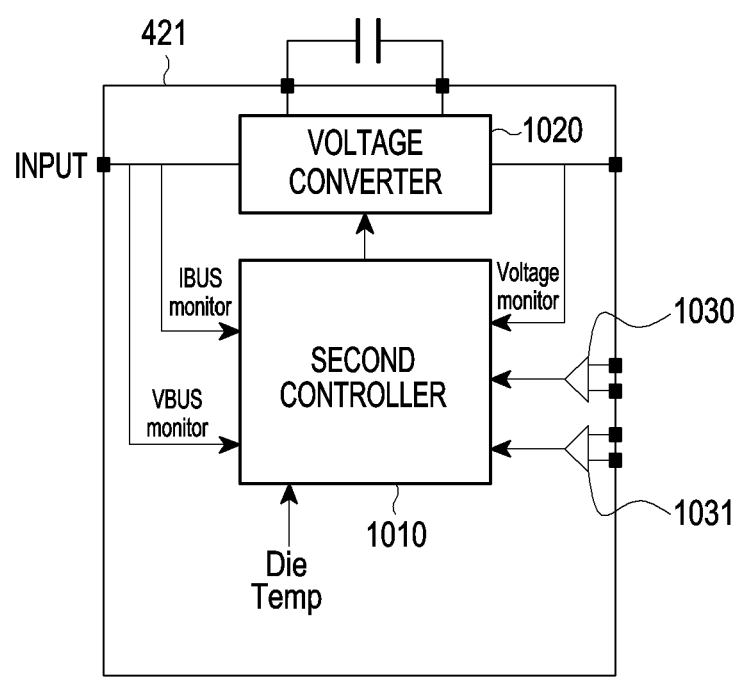
FIG. 10 is a block diagram of a second charging unit according to various embodiments of the present disclosure.

As illustrated in FIG. 10, the second charging unit 421 may further include a current sensing unit 1030 for sensing current of the battery and a voltage sensing unit 1031 for sensing the voltage of the battery. The second charging unit 421 may sense the voltage and the current of the battery through the current sensing unit 1030 and the voltage sensing unit 1031, without through the first charging unit 420.

The second controller 1010 may further sense at least one of a voltage or a current to be applied from the charger, a voltage output through the voltage converter 1020, or a temperature of the battery. The second controller 1010 may perform various protection functions for guaranteeing stability of the electronic device 101 by using the sensed information. For example, the second controller 1010 may, by using the sensed information, perform input over-voltage protection (blocking when a magnitude of an input voltage is greater than or equal to a preset threshold value), output over-voltage protection (blocking when a magnitude of an output voltage of the voltage converter 1020 is greater than or equal to a preset threshold value), input discharging (self-discharging in charger attachment/detachment), battery voltage monitoring (no charging in battery attachment/detachment), current limit (current blocking when a magnitude of a battery charging current is equal to a preset current amplitude or greater than the preset current amplitude by a preset threshold value), over-current protection (blocking when the magnitude of the input current is greater than or equal to a preset threshold value), a soft start voltage (stepwise increasing the input voltage), a soft start current (stepwise increasing the input current), over-temperature protection (stopping charging when the temperature of the battery or the temperature of the electronic device is greater than or equal to a preset threshold value), and a watch dog function.

The second charging unit 1010 may be controlled according to a signal received from the first charging unit 420 or a processor (e.g., an AP, etc.) of the electronic device 101. Thus, the second charging unit 1010 may be shut down based on a signal received from the first charging unit 420 or the processor of the electronic device 101 in a situation where fast reaction is required. In this way, a danger occurring in a charging situation may be prevented, thus improving safety during charging of the electronic device 101.

Figure 11:
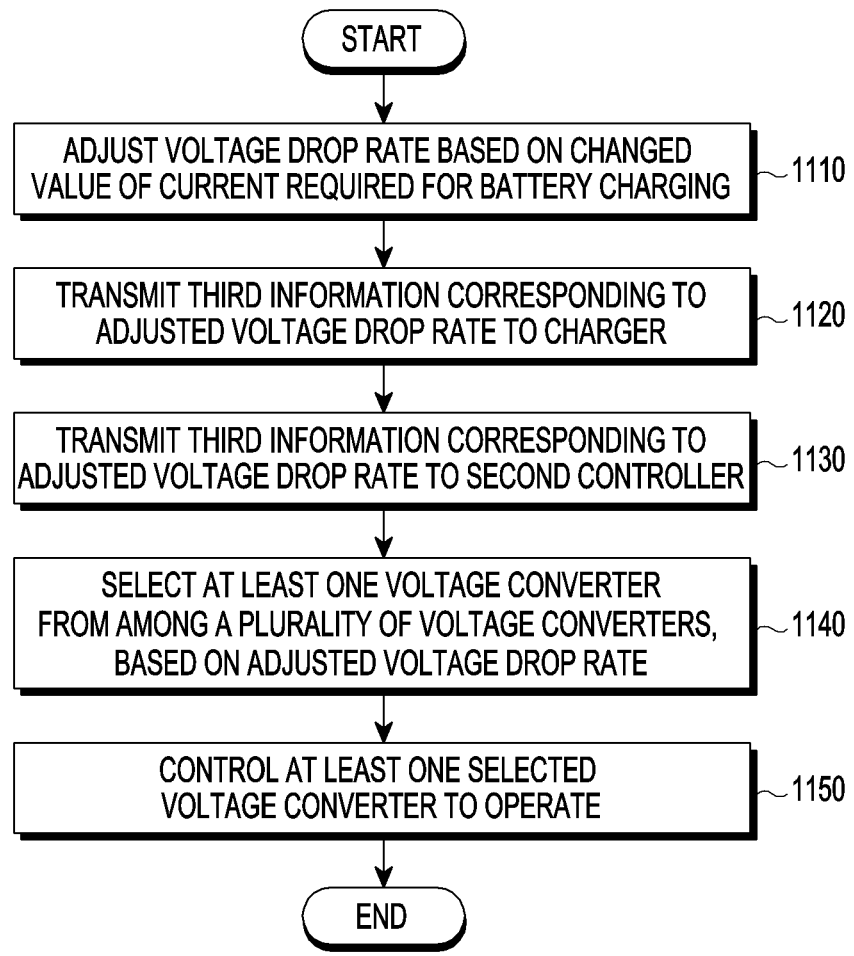
FIG. 11 is a flowchart of a method for selecting at least one voltage converter in an electronic device according to various embodiments of the present disclosure.

FIG. 11 is a flowchart of a method for selecting at least one voltage converter in an electronic device according to various embodiments of the present disclosure.

Figure 12:
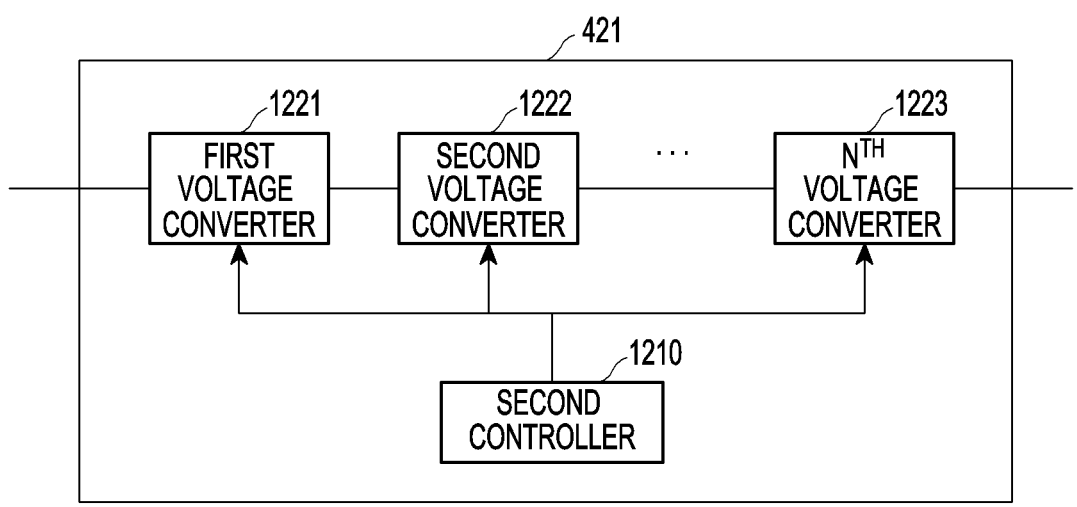
FIG. 12 is a block diagram of a second charging unit according to various embodiments of the present disclosure.

In FIG. 11, a description will be made of an operation of the electronic device 101 with respect to a change in a voltage drop rate when the second charging unit 421 includes a plurality of voltage converters 1221, 1222, and 1223 and a second controller 1210 for controlling the plurality of voltage converters 1221, 1222, and 1223 as in FIG. 12.

In operation 1110, when a value of a current required for battery charging is changed, the first controller of the first charging unit 420 may adjust the voltage drop rate set in the electronic device 101 based on the changed value of the current.

In operation 1120, the first controller may control the communication unit of the first charging unit 421 to transmit third information corresponding to the adjusted voltage drop rate to the charger. The charger may adjust the voltage to be applied to the electronic device 101 based on the received third information.

In operation 1130, the first controller may transmit the third information corresponding to the adjusted voltage drop rate to the second controller 1210.

In operation 1140, the second controller 1210 may select at least one which is to operate in a voltage drop mode for dropping an input voltage from among the plurality of voltage converters 1221, 1222, and 1223, based on the adjusted voltage drop rate identified from the third information received from the first controller. As the voltage drop rate is adjusted, the number of voltage converters used for the voltage drop is changed, such that the second controller 1210 may select at least one voltage converter that is to operate in the voltage drop mode.

For example, it is assumed that one voltage converter is configured to drop a voltage to 1/2 times thereof. In this case, when the voltage drop rate is adjusted from 1/4 to 1/8, the second controller 1210 may select three voltage converters from among a plurality of voltage converters to drop a voltage based on the adjusted voltage drop rate.

In operation 1150, the second controller 1210 may control the selected at least one converter to operate in the voltage drop mode to drop the voltage adjusted by the charger using the third information based on the adjusted voltage rate. The non-selected other voltage converters may be controlled to operate in the bypass mode for bypassing the input voltage.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

According to various embodiments, there is provided a storage medium having stored therein instructions that are configured to cause at least one processor, when executed by the at least one processor, to perform at least one operation included in a method for charging a battery in an electronic device which includes a connector including a first terminal to which a voltage is applied by an external device and a second terminal for transmitting and receiving data, a first charging unit configured to charge the battery connected to the electronic device by using the voltage applied to the first terminal, and a second charging unit configured to charge the battery by dropping the voltage applied to the first terminal based on a preset voltage drop rate, in which the at least one operation includes obtaining first information corresponding to a voltage of the battery, transmitting the first information to a charger connected with the connector, from a communication unit of the first charging unit through the second terminal, controlling a first switch of the first charging unit connected with the first terminal to supply a voltage adjusted by the charger based on the first information to the second charging unit through the first terminal, and charging the battery using the voltage dropped by the second charging unit.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
   a connector comprising a first terminal to which a voltage is applied by a charger and a second terminal for transmitting and receiving data;
   a first charging unit configured to charge a battery of the electronic device by using a first voltage applied to the first terminal; and
   a second charging unit configured to charge the battery by using a dropped voltage obtained by dropping a second voltage based on a predetermined voltage drop rate, wherein the second voltage is applied to the first terminal,
   wherein the first charging unit comprises:
      a first switch connected with the first terminal,
      a communication unit configured to transmit information through the second terminal, and
      a first controller configured to obtain first information corresponding to a voltage of the battery and other information associated with the battery, control the communication unit to transmit the first information, the other information, and the predetermined voltage drop rate to the charger connected with the connector through the second terminal, and control the first switch to supply the second voltage to the second charging unit through the first terminal, wherein the second voltage is adjusted by the charger based on the first information, the other information, and the predetermined voltage drop rate,
   wherein the other information relates to at least one of a charging current of the battery, a state of charge (SOC) of the battery, a surface temperature of the electronic device, a temperature of the battery, or a consumed current of the battery, and
   wherein the predetermined voltage drop rate is identified based on a value of a current required for charging the battery and a maximum value of a current set for a first line connecting the first terminal with the second charging unit.

2. The electronic device of claim 1, wherein the value of the current required for charging the battery is set less than or equal to a maximum value of a current set for a second line connecting the second charging unit with the battery.

3. The electronic device of claim 1, wherein the first controller is further configured to send a request for adjustment of a voltage to be applied to the first terminal to the charger, when identifying that the voltage of the battery is greater than or equal to a first threshold value and is less than a second threshold value based on the first information.

4. The electronic device of claim 1, wherein the second charging unit comprises:
   a voltage converter configured to drop the second voltage based on the predetermined voltage drop rate; and
   a second controller configured to control an operation of the voltage converter.

5. The electronic device of claim 4,
   wherein the voltage converter is further configured as a switched capacitor circuit comprising:
      a plurality of switches which are opened or short-circuited based on a duty cycle corresponding to the predetermined voltage drop rate, and
      a capacitor, and
   wherein the second controller is further configured to control an operation of the voltage converter by controlling at least one of the plurality of switches or the duty cycle.

6. The electronic device of claim 4,
   wherein the first controller is further configured to turn off the first switch to supply the second voltage to the second charging unit through the first terminal, and
   wherein the second controller is further configured to control the voltage converter to operate for dropping the second voltage.

7. The electronic device of claim 4,
   wherein the first controller is further configured to adjust the predetermined voltage drop rate, based on a changed value of a current required for charging the battery, control the communication unit to transmit second information regarding the adjusted voltage drop rate to the charger, and transmit the second information to the second controller, when the value of the current required for charging the battery is changed, and
   wherein the second controller is further configured to adjust a duty cycle of the voltage converter to correspond to a voltage drop rate identified from the second information received from the first controller and control the voltage converter to drop a third voltage adjusted by the charger by using the second information, based on the adjusted duty cycle.

8. The electronic device of claim 1,
   wherein the connector is further configured to be connected with a universal serial bus (USB) connector that supports a USB type C,
   wherein the second terminal is connected with the USB connector to transmit and receive data,
   wherein the electronic device further comprises a data converter configured to convert a format of data into a data format transmittable through a configuration channel (CC) line of the USB connector to transmit and receive data through the CC line, and
   wherein the first controller is further configured to convert a data format of the first information into a data format transmittable through the CC line of the USB connector through the data converter, when the second terminal is connected to the CC line.

9. The electronic device of claim 1,
   wherein the first controller is further configured to turn off the first switch to supply the second voltage to the second charging unit through the first terminal,
   wherein the second charging unit comprises:
      a plurality of voltage converters configured to drop a voltage to be supplied based on the predetermined voltage drop rate, and
      a second controller configured to control an operation of the plurality of voltage converters, wherein each of the plurality of voltage converters is configured as a switched capacitor circuit comprising:
a plurality of switches that are opened or short-circuited based on a duty cycle corresponding to the predetermined voltage drop rate, and
a capacitor, and
wherein, to drop the second voltage, the second controller is further configured to control at least one voltage converter selected from among the plurality of voltage converters, based on a value of the second voltage, to operate for a voltage drop.

10. The electronic device of claim 9,
wherein the first controller is further configured to adjust the predetermined voltage drop rate based on a changed value of a current required for charging the battery, control the communication unit to transmit second information regarding the adjusted voltage drop rate to the charger, and transmit the second information to the second controller, when the value of the current required for charging the battery is changed, and
wherein the second controller is further configured to select at least one voltage converter from among the plurality of voltage converters based on a value of a third voltage adjusted using the second information, and control the selected at least one voltage converter to operate for the voltage drop, to drop the third voltage adjusted by the charger by using the second information.

11. A method for charging a battery in an electronic device comprising a connector comprising a first terminal to which a voltage is applied by a charger and a second terminal for transmitting and receiving data, a first charging unit configured to charge the battery connected to the electronic device by using a first voltage applied to the first terminal, and a second charging unit configured to charge the battery by using a dropped voltage obtained by dropping a second voltage based on a predetermined voltage drop rate, wherein the second voltage is applied to the first terminal, the method comprising:

obtaining first information corresponding to a voltage of the battery and other information associated with the battery;

transmitting the first information, the other information, and the predetermined voltage drop rate to the charger connected with the connector, from a communication unit of the first charging unit through the second terminal;

controlling a first switch of the first charging unit connected with the first terminal to supply the second voltage to the second charging unit through the first terminal, wherein the second voltage is adjusted by the charger based on the first information, the other information, and the predetermined voltage drop rate; and charging the battery using the voltage dropped by the second charging unit, wherein the other information relates to at least one of a charging current of the battery, a state of charge (SOC) of the battery, a surface temperature of the electronic device, a temperature of the battery, or a consumed current of the battery, and wherein the predetermined voltage drop rate is identified based on a value of a current required for charging the battery and a maximum value of a current set for a first line connecting the first terminal with the second charging unit.

12. The method of claim 11, further comprising controlling a voltage converter, which is configured to drop the second voltage based on the predetermined voltage drop rate, of the second charging unit to operate for dropping the second voltage.

* * * * *